INCREASE OF IMAGE CONTRAST WITH TELEVISION PICKUP TUBE

Filed Jan. 26, 1952

WITNESSES:
E. A. McCloskey
Leroy M. Garman

INVENTOR
Richard L. Longini.
BY F. E. Browder
ATTORNEY

United States Patent Office 2,900,445
Patented Aug. 18, 1959

2,900,445

INCREASE OF IMAGE CONTRAST WITH TELEVISION PICKUP TUBE

Richard L. Longini, Pittsburgh, Pa., assignor to Westinghouse Electric Corporation, East Pittsburgh, Pa., a corporation of Pennsylvania Application January 26, 1952, Serial No. 268,371
8 Claims. (Cl. 178—6.8)

My invention relates to picture reproducing systems and in particular relates to a system for reproducing pictures in television or otherwise, which have a background of high light intensity compared with the intensity variations from point to point over the picture area.

When a pickup tube in which image storage occurs, as in the image orthicon for example, is used in reproducing a scene having a high background light intensity, the storage elements all tend to reach a saturation potential between sweeps of the scanning beam with the result that no detectable signal is present in the pickup tube output to correspond with the light-intensity variations over the scene. My invention comprises a system for deriving an output current which varies in correspondence with the light-intensity variations from point-to-point over such a picture, separating these out from the effect of background light and even of "noise" arising within the pickup tube. This result is achieved by scanning the image-storage screen in a time which is short relative to the light-decay period of the picture-receiver screen.

One object of my invention is accordingly to provide an improved picture reproduction system.

Another object is to provide a system particularly adapted to reproduce pictures having a high background lighting.

Yet another object is to provide a system for segregating the components which correspond to space-variation of picture intensity in the output of a picture-pickup tube of the storage type from the components due to background light and those due to tube "noise."

Still another object is to provide a system of picture reproduction which shall suppress, on its output screen, the background lighting while retaining the contrasts between objects present in the picture.

A still further object is to provide a means of cascading image-storage devices to segregate the effect of point-to-point light variations in the picture from the effects of background light and tube "noise."

Other objects of my invention will become apparent upon reading the following description taken in connection with the drawings, in which.

Figures 1, 2:
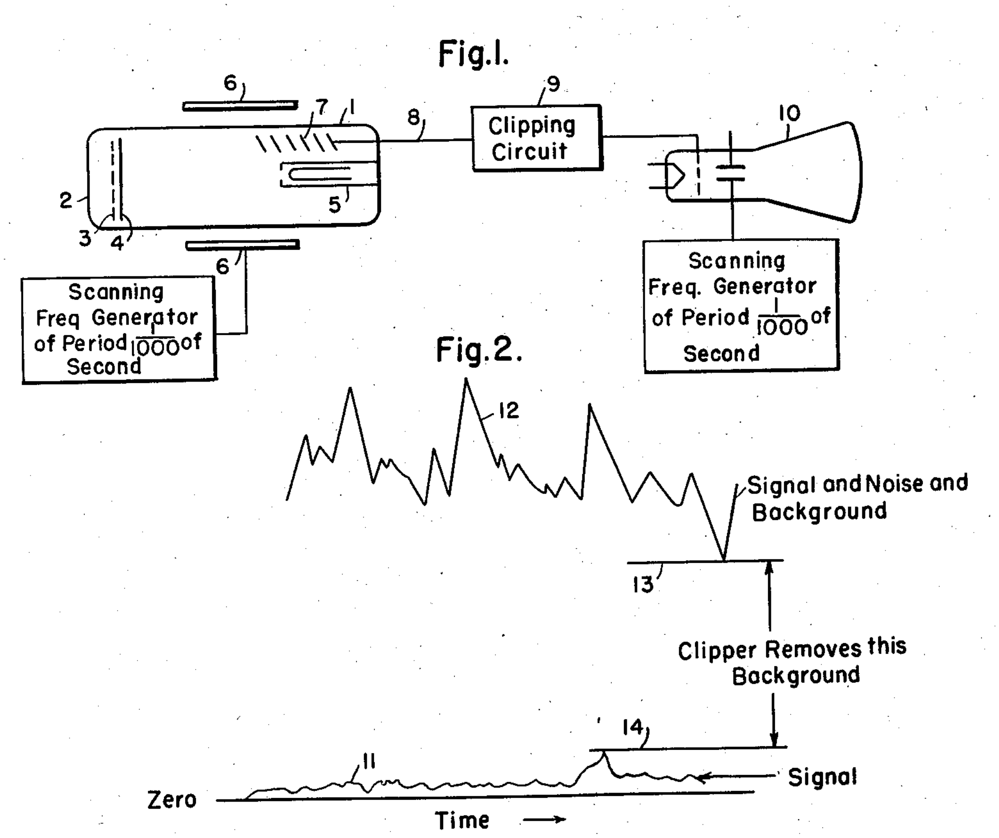
Figure 1 is a diagrammatic showing of one system embodying certain principles of my invention.
Fig. 2 is a graph showing the variation with time of currents in certain portions of the Fig. 1 arrangement.

Referring in detail to Fig. 1, the tube 1 is an image orthicon of conventional structure, except that the sweep of its electron scanning-beam is arranged to operate with a frequency many times, e.g. 20 times, that of presently conventional image orthicon tubes. In other words, its electron-beam scans the entire picture-area on its image-storage plate in around one thousandth of a second. Since the structure and operation of image-orthicon pickup tubes is so well known today, it is believed that the description here may be confined to a statement that the picture to be reproduced is focussed on a photoelectric screen 2 located on the end of tube 1 to produce an electron-image which is accelerated by a screen-electrode 3 into incidence with a thin sheet 4 of high resistance material (e.g. glass) to store on the latter an electrical charge-image which is intended to vary from point-to-point over the area of sheet 4 in correspondence with the light distribution focussed on photoelectric screen 2. The electron scanning beam formed by electron-gun 5 is swept by deflection coils 6 so as to scan the charge-image stored on screen 4, neutralizing the latter and causing a current to flow through secondary-electron-amplifier 7 to the output lead 8.

As stated above, a picture with a background intensity on input screen 2 above a certain value will result in saturation of the charge-screen 4 so that every part of it is charged to the same potential, if the conventional scanning period is used for screen 4. However, when, as here, the electron image flows from photoelectric input screen 2 to charge the screen 4 for only about one-twentieth of the conventional time between successive traverses of the scanning beam, the accumulated charge is never sufficient to saturate any part of the charge-screen 4, and the current 12 from output-lead 8 has a component like curve 11 in Fig. 2 which correctly represents the variations of light-intensity point-by-point over the picture on screen 2. The current 12 will, of course, also have a varying component produced by "noise" due to statistical variations of the electron-beam and other electron currents in the tube, and this may have an amplitude of variation considerably larger than that of component 11, as curve 12 illustrates. The output current 12 will, of course, also have a component represented by the ordinates between the lower ordinate of curve 12 and the zero line in Fig. 2 which corresponds to background light and, with pictures of the type predicated here, this component will be considerably larger than the curve 11 component.

The output lead 8 is connected to a clipping-circuit 9, which may be of any suitable type known in the art, and then to the input electrode of a kinescope 10 which also may be of a conventional type except that the phosphors composing its fluorescent picture screen have an unusually large time constant. A suitable clipping circuit is described in "Theory and Design of Television Receivers" by S. Deutsch in chaper 9, page 284. The time constant is the time required after passage of the scanning beam for the light emitted to fall to $$\frac{1}{2.7}$$

(i.e. about 37%) of its maximum value. The persistence of the phosphor may have periods up to any value that will not interfere with satisfactory portrayal of such movements as may be present in the picture focussed on input screen 2; a persistence period of the order of one-twentieth of a second would suit many situations. Low brightness pictures do not require as high persistence in the phosphor as do bright pictures, since at the former levels the persistence of the eye will often suffice.

The clipping circuit 9 is adjusted so that its output subtracts from the ordinates an amount of voltage approximately equal to the difference between the highest ordinate 14 likely to appear in the contrast signal curve 11 and the shortest ordinate 13 expected to appear in the composite curve 12 for output lead 8. The clipping circuit 9 thus in effect removes the voltage corresponding to the steady intense background lighting of the picture on input screen 2 minus a small amount to assure transmission of the light variation signal and transmits to kinescope 10 only the true contrast signal 11 and the tube "noise." However, because the scanning frequency of the electron-beam in tube 1 is many times the peristence-period of the light from the fluorescent phosphor on the output screen of kinescope 10, the intensity of the light from any one elemental area of the latter represents the integral of the voltage transmitted from clipping circuit 9 for many sweeps of the scanning beam over the corresponding area of the charge image on screen 4. The contrast signal component 11 will be of substantially the same value at the time of each sweep of the scanning beam over the elemental area in question during the entire persistence-period of the phosphor, so the successive light-effects on that area of the kinescope screen will all be additional; but the component of the voltage at output lead 8 which is due to tube "noise" is random, and will tend to cancel out in effect on the light-intensity of that elemental area on the kinescope screen. As a result the effect of background light in the picture, and of tube "noise" on the light-image on the screen of kinescope 10, are largely eliminated and the contrasts present in the picture focussed on input screen 2 are reproduced and relatively emphasized.

Figure 3:
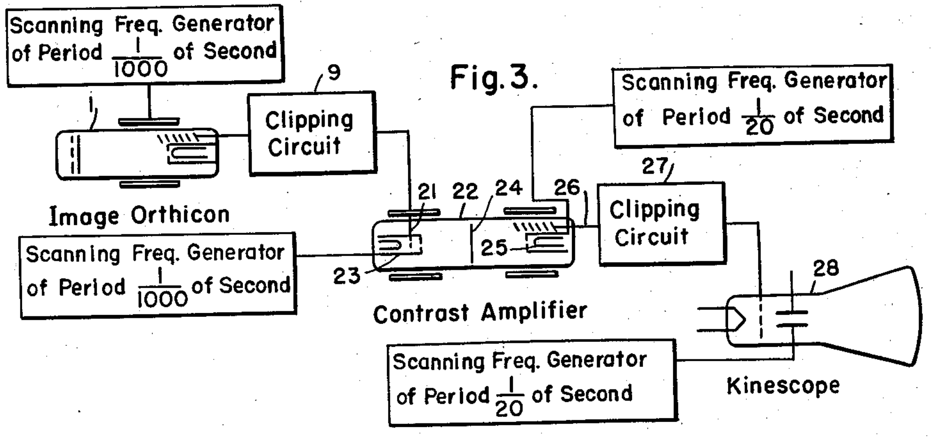
Fig. 3 is a diagrammatic showing of another modification of my invention.

Even further increase of contrasts may be attained by picking up the picture on the output screen of kinescope 10 by a second system of the type shown in Fig. 1; or the arrangement shown in Fig. 3, using what I may term a contrast-amplifier tube, may be employed.

In Fig. 3, the picture is to be focussed on the input screen of an image orthicon or other image-storage type tube 1 which is arranged like tube 1 in Fig. 1 to have an abnormally high sweep frequency. Its output voltage which will be of the same type as curve 12 of Fig. 2 is impressed, preferably through a first clipping circuit 9, on the control electrode 21 of the contrast-amplifier tube 22. In the latter, a first electron gun 23, of conventional type but of the same scanning frequency as used in tube 1, traverses a target 24 of high-resistance material such as thin glass similar to the conventional targets used in image orthicons. The variation of intensity of the scanning beam from electron gun 23 by the signal impressed on control-electrode 21 as that beam scans target 24 will leave a charge-distribution on the latter which corresponds point-by-point with the light distribution in the picture focussed on the input-screen of tube 1.

A second electron gun 25 scans the reverse side of target 24 but with a frequency as low as is compatible with proper portrayal of motions present in the picture on the input screen of tube 1. As a result of the relative frequencies of the two scanning beams in contrast-amplifier tube 22, the scanning-beam from gun 23 will traverse a given elemental area of target 24 many times between successive traverses of that area by the scanning beam from electron gun 25. In short, the charge neutralized when the scanning-beam from electron gun 25 is incident on any given elementary area of target 24 represents the integration of the charges deposited on that area during many passages thereover of the variable electron-beam from electron gun 23; and the latter charges correspond, one-by-one, to the ordinates of the curve 12 of Fig. 2 which corresponds to the various instants of such passage. Thus the charge at a given elemental area of target 24 when the scanning-beam from gun 25 reaches it corresponds with the integral of many separate ordinates of curve 12 of Fig. 2; that is to say, this charge is the integral of the sum of many separate ordinates representing the contrast signal (curve 11), the background lighting and the tube "noise" which are the components of curve 12.

Now, as was explained in the case of the phosphors in the output-screen of kinescope 10 in Fig. 1, the ordinates of tube "noise" are random and will tend to cancel out over periods large compared with the scanning periods of the picture pickup tube; but the ordinates of the contrast curve 11 are repetitive for each particular elemental picture area, and add their effects. Hence, the effect of tube "noise" on the charge accumulated at any elemental area of target 24 is minimized relative to the effect of light-contrasts in the picture being picked up.

The charge neutralized at any elementary area of target 24 while the scanning beam from electron-gun 25 is incident on it produces a voltage fluctuation at output-lead 26 which is sent through a connecting channel to a conventional kinescope 28 on the screen of which the output picture appears. This channel may, if desired, embody a clipping circuit 27 which is adjusted, like the clipping circuit 9 in Fig. 1, to remove any background signal between the ordinates 13 and 14 of Fig. 2 which may remain in the voltage impressed on the input screen of the latter. The effects of both background light in the input picture and tube "noise" has been minimized and the relative effects of light-contrasts in the input circuit accentuated.

While I have described the foregoing arrangements as adapted for pictures with background lighting so high as to cause saturation effects on the pickup tube targets, both the Fig. 1 and Fig. 3 arrangements are useful for accentuating contrasts in pictures even in cases where no difficulties from saturation appear.

I claim as my invention:

1. A picture-reproducing system comprising a picture pickup means of the type which employs a first picture scanning agency, means for clipping a substantial portion of the output from said picture pickup means without affecting the light intensity variation signal of the viewed scene, a second scanning agency having the same frequency as said first scanning agency and connected to the output of said first scanning agency and provided with means whereby the output of said means for clipping produces a charge-distribution that varies from point-to-point with the light-intensity distribution in said picture, a third scanning-agency which scans said charge-distribution with a frequency substantially lower than that of said first scanning-agency and thereby produces an output voltage which varies in time in correspondence with said point-to-point distribution, and picture-receiving means connected to translate said output voltage into visible pictures which are excited by a light-generating scanning agency having said substantially lower scanning frequency.

2. A picture-reproducing system comprising a picture pickup means of the type which employs a first picture scanning agency, a first means for clipping a substantial portion of the output from said picture pickup means without affecting the light intensity variation signal of the viewed scene, a second scanning agency having the same frequency as said first scanning agency and connected to the output of said first scanning agency and provided with means whereby the output of said first means for clipping produces a charge-distribution that varies from point-to-point with the light-intensity distribution in said picture, a third scanning-agency which scans said charge-distribution with a frequency substantially lower than that of said first scanning-agency and thereby produces an output voltage which varies in time in correspondence with said point-to-point distribution, and picture-receiving means connected through a second means for clipping to translate said output voltage into visible pictures which are excited by a light-generating scanning agency having said substantially lower scanning frequency.

3. A picture-reproducing system comprising a picture pickup means of the image-storage type having a scanning-period, means for clipping a substantial portion of the output of said pickup means without affecting the light intensity variation signal of the viewed scene, a storage-target and means for causing the output of said means for clipping to make a distribution of charges over its surface in synchronism with said scanning-period, a means for periodically discharging said charges with a period large compared with said scanning-period into an output channel, and picture-receiving means having a light-exciting beam operating at said large period and connected to translate the current in said output channel into visible pictures.

4. A picture-reproducing system comprising a picture pickup means of the image-storage type having a scanning-period, a first means for clipping a substantial portion of the output of said pickup means without affecting the light intensity variation signal of the viewed scene, a storage-target and means for causing the output of said first means for clipping to make a distribution of charges over its surface in synchronism with said scanning-period, a means for periodically discharging said charges with a period large compared with said scanning-period into an output channel, and picture-receiving means having a light-exciting beam operating at said large period and connected to translate the current in said output channel into visible pictures, said channel being provided with a second means for clipping.

5. A picture-reproducing system comprising a picture pickup tube of the image orthicon type in which the picture area is scanned in about 0.001 second, means for clipping a substantial portion of the output of said tube, a contrast-amplifier having a storage-target, an electron-beam scanning said storage-target in synchronism with the scanning in said pickup tube and modulated by the output of said means for clipping, a second electron-beam scanning said storage-target with a period substantially larger than 0.001 second and provided with an output electrode which carries current modulated in accordance with the discharging of said storage-target by said second electron-beam, and a kinescope connected to said output electrode and having a scanning beam synchronized with said second electron-beam.

6. A picture-reproducing system comprising a picture pickup tube of the image orthicon type in which the picture area is scanned in about 0.001 second, a means for clipping a substantial portion of the output of said tube, a contrast-amplifier having a storage-target, an electron-beam scanning said storage-target in synchronism with the scanning in said pickup tube and modulated by the output of said means for clipping, a second electron-beam scanning said storage-target with a period substantially larger than 0.001 second and provided with an output electrode which carries current modulated in accordance with the discharging of said storage-target by said second electron-beam, and a kinescope connected to said output electrode through a means for clipping and having a scanning beam synchronized with said second electron-beam.

7. An image reproducing system comprising a pickup tube, means for projecting an optical image onto said pickup tube to produce a corresponding charge image on a storage target provided within said pickup tube, an electron beam scanning means of a first scanning period for deriving from said charge image on said storage target a train of electrical signals as the output of said pickup tube, means for substantially clipping the signal component from said train of signals corresponding to the background light within said image, a display device comprising a beam scanning system of similar scanning period as said pickup tube, means for modulating the scanning system of said display device with the signals from said clipping means, said display tube comprising a screen member for displaying an image, said screen comprised of a light producing material having a display time several times greater than the scanning period of said scanning beam.

8. An image reproducing system comprising a light sensitive pickup tube, means for projecting an optical image onto said pickup tube to produce a corresponding charge image on a storage target provided within said pickup tube, means for scanning said storage target with an electron beam to remove said charge image and provide an output of a train of electrical signals corresponding point to point to a scanning movement of said beam, the scanning period of said electron beam such that the storage target of said pickup tube will not reach saturation during one scanning period, means for substantially clipping the electrical component corresponding to the background light in said image in the train of signals derived from the output of said pickup tube to substantially remove the background signal, a display device comprising a display screen and a scanning system of a similar period as said pickup system, said display screen having a display time several times greater than the scanning period of said display device.

References Cited in the file of this patent

UNITED STATES PATENTS

| | | |
|---|---|---|
| 2,250,476 | Evans | July 29, 1941 |
| 2,273,172 | Beers | Feb. 17, 1942 |
| 2,277,516 | Henroteau | Mar. 24, 1942 |
| 2,293,899 | Hanson | Aug. 25, 1942 |
| 2,406,266 | Sziklai | Aug. 20, 1946 |
| 2,454,652 | Iams et al. | Nov. 23, 1948 |
| 2,555,424 | Sheldon | June 5, 1951 |
| 2,629,010 | Graham | Feb. 17, 1953 |
| 2,696,523 | Theile | Dec. 7, 1954 |
| 2,786,887 | De France | Mar. 26, 1957 |